(12) United States Patent
Chiang et al.

(10) Patent No.: US 10,721,794 B2
(45) Date of Patent: Jul. 21, 2020

(54) INTELLIGENT STREET LIGHT

(71) Applicant: IPSecures Corporation, Taipei (TW)

(72) Inventors: Hung-Hsiang Chiang, Kaohsiung (TW); Kai-Yuan Kuo, Taipei (TW)

(73) Assignee: IPSECURES CORPORATION, Taipei (TW)

( * ) Notice: Subject to any disclaimer, the term of this patent is extended or adjusted under 35 U.S.C. 154(b) by 127 days.

(21) Appl. No.: 15/721,699

(22) Filed: Sep. 29, 2017

(65) Prior Publication Data

US 2018/0098379 A1 Apr. 5, 2018

(30) Foreign Application Priority Data

Sep. 30, 2016 (TW) .............................. 105131543 A

(51) Int. Cl.
*H04W 88/10* (2009.01)
*H04B 10/112* (2013.01)
*F21W 131/103* (2006.01)
*F21S 8/08* (2006.01)
*H04W 84/04* (2009.01)

(52) U.S. Cl.
CPC ........ *H04W 88/10* (2013.01); *H04B 10/1129* (2013.01); *F21S 8/085* (2013.01); *F21W 2131/103* (2013.01); *H04W 84/047* (2013.01)

(58) Field of Classification Search
CPC ................ H04W 88/10; H04W 84/047; H04B 10/1129; F21W 2131/103; F21S 8/085
See application file for complete search history.

(56) References Cited

U.S. PATENT DOCUMENTS

| | | | |
|---|---|---|---|
| 2008/0231116 A1* | 9/2008 | Keenly | G06F 1/26 307/44 |
| 2009/0003277 A1* | 1/2009 | Uppili | H04W 36/30 370/331 |
| 2011/0084585 A1* | 4/2011 | Ku | F21S 8/086 313/12 |
| 2017/0122546 A1* | 5/2017 | Abbott | F21S 8/086 |

* cited by examiner

*Primary Examiner* — Yuwen Pan
*Assistant Examiner* — Fatuma G Sherif
(74) *Attorney, Agent, or Firm* — Chun-Ming Shih; Lanway IPR Services

(57) ABSTRACT

An intelligent street light includes a lamppost and a data transmission system provided at the bottom of the lamppost. The data transmission system includes a data transmission unit, a data exchange unit and a plurality of network devices, which are connected to each other. The data transmission system allows data transmission to be performed between itself and a remote server. This can improve utilization of public resources, reduce construction costs and shorten construction periods of base stations, and effectively enhance coverage of communication signals to improve the quality of communication.

18 Claims, 4 Drawing Sheets

INTELLIGENT STREET LIGHT

CROSS-REFERENCE TO RELATED APPLICATIONS

This application claims the priority of Republic of China Patent Application No. 105131543 filed on Sep. 30, 2016, in the State Intellectual Property Office of the R.O.C., the disclosure of which is incorporated herein by reference.

BACKGROUND OF THE INVENTION

Field of the Invention

The invention relates to the field of communication facilities, and more particularly, to an intelligent street light having a data communication function.

Descriptions of the Related Art

In densely populated urban areas there has long existed a problem that base stations do not have sufficient channel capacities and usually are not able to meet growing demands of communication service in those areas. An effective solution to this problem is to build new mobile communication base stations. However, urban public land available for communication operators to build base stations is becoming limited due to rapid developments in the city, and more and more residents protest against building the base stations due to health concerns, thereby leading to great difficulty in finding a place where the base stations can be built.

Moreover, traditional municipal street lights generally are only used for road lighting and thus are restricted in function. Current municipal street lights nevertheless are usually provided with infrastructure including electricity introduction, lightning protection grounding and towers (which have a certain height for wireless signal emission), and relatively are widely distributed. Such infrastructure happens to be necessary for construction of communication base stations. Therefore, how to effectively utilize current city infrastructure to solve the problem of existing base stations is thus an important task in the art.

SUMMARY OF THE INVENTION

In view of the above drawbacks in the prior art, a primary object of the invention is to provide an intelligent street light, which can resolve the difficulty in finding a place for building base stations and is thus favorable to overall designing and planning of the city.

Another object of the invention is to provide an intelligent street light, which can reduce construction costs and shorten construction periods of base stations.

Further object of the invention is to provide an intelligent street light, which can improve utilization of public resources.

For the objects said above and for other objects, the invention provides an intelligent street light for allowing data transmission between the street light and a remote server, including: a lamppost; and a built-in data transmission system provided at bottom of the lamppost, the data transmission system including a data transmission unit, a data exchange unit and a plurality of network devices, which are connected to each other, wherein, the data transmission unit is for performing data transmission between the data transmission unit and the remote server; and the data exchange unit is respectively connected to the data transmission unit and the plurality of network devices so as to provide service of data exchange and transmission between the plurality of network devices and the data transmission unit.

Preferably, for the intelligent street light said above, wherein the bottom of the lamppost includes a base, and the data transmission system is built in the base, wherein the base includes a receiving space, a discharge space and a liquid guiding structure, wherein the receiving space is located above the discharge space and accommodates the data transmission system, and the liquid guiding structure is for guiding any liquid inside the base away from the receiving space to flow to the discharge space where the liquid is discharged out of the base.

Preferably, for the intelligent street light said above, wherein further includes an antenna provided at top of the lamppost, for providing data exchange and transmission service.

Preferably, for the intelligent street light said above, wherein the data transmission unit is a telecom backhaul unit, for performing data transmission between the data transmission system and the remote server by means of various types of xDSL (Digital Subscriber Line), HFC (Hybrid Fiber Coaxial), LTE (Long Term Evolution), Microwave, WiFi and DSRC (Dedicated Short Range Communications).

Preferably, for the intelligent street light said above, wherein the data transmission system further includes a fiber distribution unit connected to the data transmission unit, for performing data transmission between the data transmission system and the remote server by means of PON (Passive Optical Network), CES (Carrier Ethernet Switch), PTN (Public Transport Network) and SDN (Software Defined Network) Switch.

Preferably, for the intelligent street light said above, wherein the network devices further include a wireless access unit, and the data transmission system further includes an RF over fiber unit for transmitting wireless signals from the wireless access unit to the fiber distribution unit to allow the wireless signals to be transmitted through fiber cables.

Preferably, for the intelligent street light said above, wherein further includes a lamp (that is light armature holder and fixture) formed on and extended from the lamppost, and at least one external device provided on the lamp. The external device is one of an IP device (that is internet protocol based device) and a sensor.

Preferably, for the intelligent street light said above, wherein the external device is selectively connected to the data exchange unit, for allowing the data exchange unit to provide data exchange and transmission service for the external device.

Preferably, for the intelligent street light said above, wherein the data exchange unit is a PoE switch unit connected to an RJ45 terminal, for providing power and data transmission service for the external device.

Preferably, for the intelligent street light said above, wherein the network devices further include a gateway unit selectively connected to the external device, for managing the external device, setting configuration parameters of the external device and providing data transmission service for the external device.

Preferably, for the intelligent street light said above, wherein the gateway unit is an IoT gateway unit, which includes a southbound interface for being connected to the external device, and a northbound interface for being connected to the data exchange unit or for direct LTE backhaul.

Preferably, for the intelligent street light said above, wherein the intelligent street light is for allowing data transmission between the street light and a near end device, and the gateway unit is selectively connected to the near end device, for managing the near end device, setting configuration parameters of the near end device and providing data transmission service for the near end device. The near end device is one of a gateway unit provided close to a body of the intelligent street light, an IP device and a sensor.

Preferably, for the intelligent street light said above, wherein the network devices further include a wireless access unit for allowing at least one mobile client to perform wireless accessing so as to provide data exchange and transmission service for the mobile client.

Preferably, for the intelligent street light said above, wherein the network devices further include a lighting control unit for controlling and monitoring a lighting device mounted on the intelligent street light.

Preferably, for the intelligent street light said above, wherein further includes a power system for providing power required for operation of intelligent street light. The data transmission system further includes the a power distribution unit electrically connected to the power system and connected to a UPS unit and a power supply control unit, wherein: the UPS unit is for providing backup power; the power supply control unit is for detecting a power supply state of the power system, wherein if the power system is detected being in a power on state, the power supply control unit controls the power system to supply electricity to the data transmission system and to charge the UPS unit, and if the power system is detected being in a power off state, the power supply control unit controls the UPS unit to output the backup power to supply electricity to the data transmission system.

Preferably, for the intelligent street light said above, wherein the data transmission system further includes a remote monitoring unit for monitoring a power supply state of the power distribution unit, a data transmission state of the data transmission unit, an operation state of the network devices and a synchronous timing state of the network devices.

Compared to the conventional technology, the intelligent street light of the invention has a data transmission system provided at the bottom of its lamppost, and thus functions for normal lighting as well as helps communication data transmission, thereby improving utilization of public resources. Moreover, the invention incorporates the existing conditions such as electricity introduction, lightning protection grounding and wide distribution of current street lights. This may reduce construction costs and shorten construction periods of base stations, and make the base stations have uniform signal coverage to improve the quality of communication.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
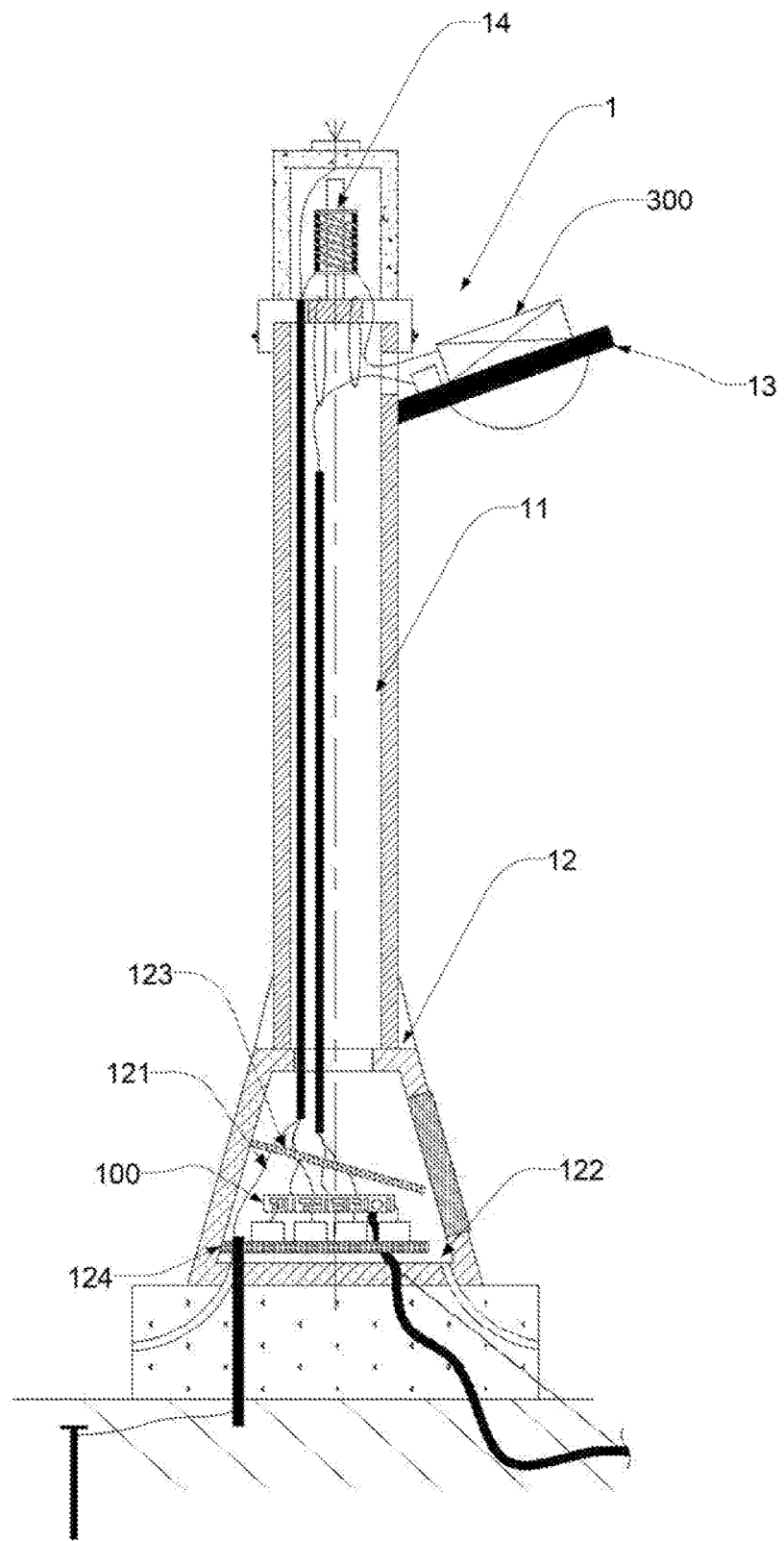
FIG. 1 is an architectural schematic diagram of an intelligent street light of the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2A:
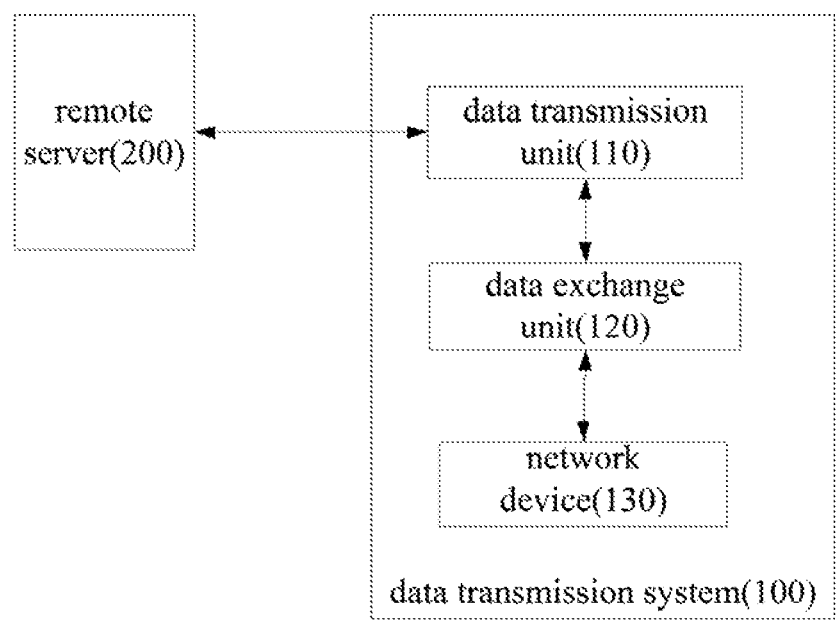
FIG. 2A is a basic architectural schematic diagram of a data transmission system built in a lamppost shown in FIG. 1.

Referring to FIGS. 1 and 2A, FIG. 1 is an architectural schematic diagram of an intelligent street light of the invention, and FIG. 2A is a basic architectural schematic diagram of a data transmission system built in a lamppost shown in FIG. 1. As shown in FIG. 1, the intelligent street light 1 of the invention includes the lamppost 11 (such as a steel pipe) and the built-in data transmission system 100 installed at the bottom of the lamppost 11, wherein the data transmission system 100 allows data transmission between itself and a remote server 200. As shown in FIG. 2A, the data transmission system 100 includes a data transmission unit 110, a data exchange unit 120 and a plurality of network devices 130, which are interconnected. Particularly, the data transmission unit 110 is used to perform data transmission between itself and the remote server 200, and the data exchange unit 120 is respectively connected to the data transmission unit 110 and the plurality of network devices 130 so as to provide service of Ethernet data exchange and transmission between the plurality of network devices 130 and the data transmission unit 110.

Figure 2B:
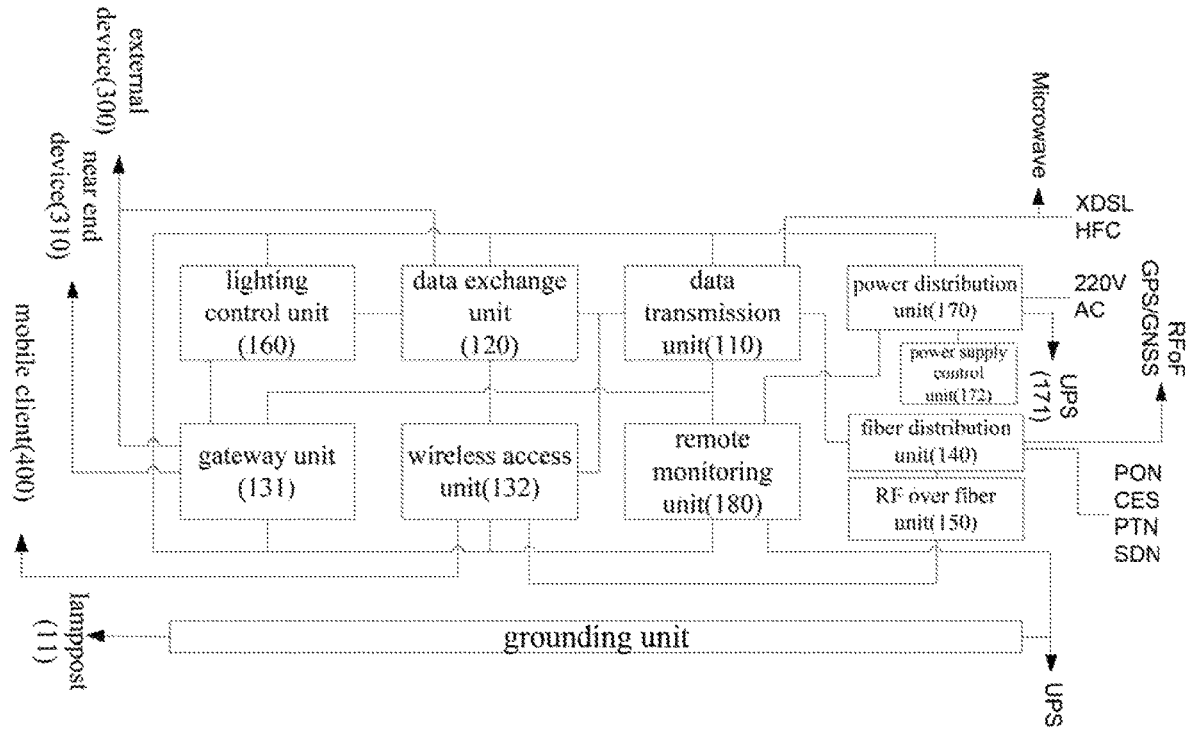
FIG. 2B is an architectural schematic diagram of an embodiment of the data transmission system built in the lamppost shown in FIG. 1.

The following description is to depict preferred embodiments of the intelligent street light 1 of the invention with reference to FIGS. 1 and 2B, wherein FIG. 2B is an architectural schematic diagram of an embodiment of the data transmission system built in the lamppost shown in FIG. 1.

Referring to FIG. 1, in a preferred embodiment, the lamppost 11 has a base 12 at its bottom, and the data transmission system 100 is installed in the base 12. The base 12 includes a receiving space 121, a discharge space 122 and a liquid guiding structure 123. The receiving space 121 is located above the discharge space 122 and accommodates a carrier unit 124 (which may be composed of a rail, a mounting support and a carrier board) for mounting the data transmission system 100 thereon. The liquid guiding structure 123 is used to guide any liquid inside the base 12 away from the receiving space 121 to flow to the discharge space 122 where the liquid is discharged out of the base 12, in order to protect the data transmission system 100 from being damaged by external contaminants (such as water drops and dust). Moreover, the intelligent street light 1 may further include a grounding unit (as shown in FIG. 2B) for protecting the intelligent street light 1 (including the data transmission system 100) against thunder attack. It should be noted that the intelligent street light 1 of the invention is not limited to the above structural arrangements but is flexible in design according to practical requirements.

The intelligent street light 1 may further include an antenna 14 provided at the top of the lamppost 11. The antenna 14 is used to provide data exchange and transmission service, and can be GPS antenna or GNSS antenna.

In this embodiment, the data transmission unit 110 is for example a telecom backhaul unit, and achieves communication connection between the data transmission system 100 and the remote server 200 by means of such as various types of xDSL (Digital Subscriber Line), HFC (Hybrid Fiber Coaxial), LTE (Long Term Evolution), Microwave and so on, such that data can be transmitted between the data transmission system 100 and the remote server 200.

Preferably, the data transmission system 100 further includes a fiber distribution unit 140 having several parts such as splicing tray, patch panel, adapter, fiber protection tube and so on. The fiber distribution unit 140 is used to connect the data transmission unit 110 to the remote server 200 by means of a fiber network, for example, PON (Passive Optical Network), CES (Carrier Ethernet Switch) and PTN (Public Transport Network), etc., such that data transmission can be performed between the data transmission system 100 and the remote server 200.

Further referring to FIG. 1, there is provided a lamp 13 extended from an upper end of the lamppost 11. An associated lighting device (not shown) of the intelligent street light 1 is installed in the lamp 13, and at least one external device 300 can be mounted on the lamp 13. This design allows the existing lamp 13 to serve as a mounting support for the external device 300, thereby no need to provide an additional mounting device for installing the external device 300. Moreover, generally there are ready-made power lines placed on the lamp 13 to supply electricity to the lighting device for operation. Thus, the above design does not need additional power lines dedicated for the external device 300 and may effectively reduce construction costs. The external device 300 is for example an IP device (Internet Protocol based Device) or a sensor (such as security camera, temperature and humidity sensor, air quality sensor, RF signal sensor or Photocell, NEMA Node and so on).

In an embodiment of the invention, the external device 300 may selectively be connected to the data exchange unit 120 such that the data exchange unit 120 may provide data exchange and transmission service for the external device 300. Preferably, the data exchange unit 120 further provides electricity required for operation of the external device 300 connected to the data exchange unit 120. For example, the data exchange unit 120 can be a PoE switch unit connected to an RJ45 terminal to incorporate electricity transmission with data transmission such that the external device 300 is entitled to electricity and data transmission service.

As shown in FIG. 2B, the network devices 130 further include a gateway unit 131. In an embodiment, the external device 300 may selectively be connected to the gateway unit 131 that can manage the external device 300, set relevant configuration parameters of the external device 300 and provide data transmission service for the external device 300. Particularly, the gateway unit 131 is an IoT gateway unit, which includes a Southbound interface for being connected to the external device 300, and a Northbound interface for being connected to the data exchange unit 120 or for inserting a SIM card therein for direct LTE backhaul. The IoT gateway unit has some management functions such as software download, device restart, device configuration and monitoring, which conform to the external device 300. Moreover, the IoT gateway unit allows the Northbound interface to be connected through an adapter card to various types of IoT cloud computing devices (such as OpenADR, ETSI and so on), and allows the Southbound interface to have short distance communication connection with the outside by means of wireless connection (such as WIFI, BLE, Zigbee, Wi-Sun, LTE-M, NB-IOT, LoRa, DSRC and so on) or other types of wired connection.

In an embodiment, the intelligent street light 1 may further allow data transmission to be performed between itself and a near end device 301 so as to expand its functions or form expansion of network architecture. For example, the near end device 301 is one of an IP device and a sensor, provided close to a body of the intelligent street light 1, wherein the sensor can be a sensor for monitoring if sewer water state is normal. Alternatively, the near end device 301 includes a gateway unit 131 of another device provided close to the body of the intelligent street light 1. This gateway unit 131 is selectively connected to the near end device 301 to manage the near end device 301, set configuration parameters of the near end device 301 and provide data transmission service for the near end device 301, such that functional expansion of the intelligent street light 1 or expansion of network architecture is achieved.

Referring to FIGS. 1 and 2B, the network devices 130 of the invention further include a wireless access unit 132 for allowing at least one mobile client 300 (such as mobile phone, tablet or laptop) to perform wireless accessing. The wireless access unit 132 thus may serve as a mobile base station (smaller than 5 W) for providing the at least one mobile client 300 with mobile data exchange and transmission service, and may also serve as a hotspot application wireless AP. Moreover, the wireless access unit 132 may provide relevant configuration and installation service for the data transmission system 100 through Bluetooth transmission.

In an embodiment, the data transmission system 100 further includes an RF over fiber unit 150 for transmitting wireless signals from the wireless access unit 132 to the fiber distribution unit 140 (or the antenna 14). This is to allow the wireless signals to be transmitted through fiber cables and thereby reduce signal loss during transmission.

Figure 2C:
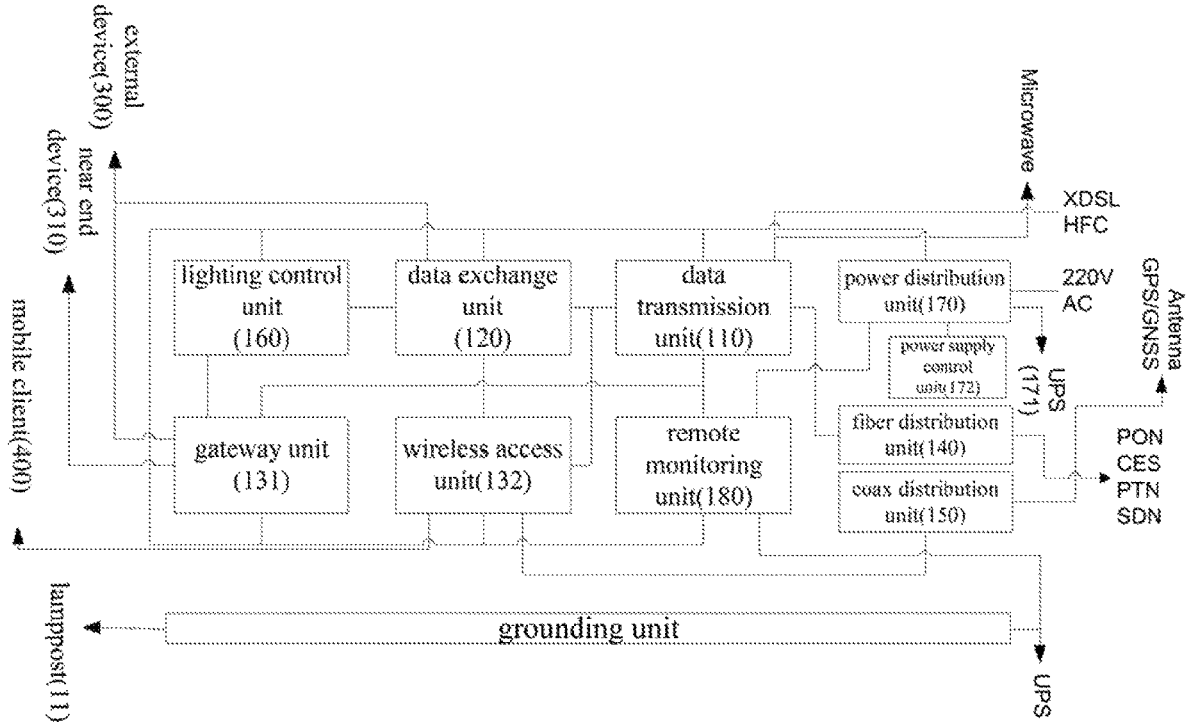
FIG. 2C is an architectural schematic diagram of an embodiment of the data transmission system built in the lamppost shown in FIG. 1.

Referring to FIG. 2C, the data transmission system 100 further includes a coax distribution unit 190 for transmitting wireless signals from the wireless access unit 132 to the antenna 14. This is to allow the wireless signals to be transmitted through coax cables.

Moreover, as shown in FIG. 2B, the network devices 130 of the data transmission system 100 may further include a lighting control unit 160 for controlling and monitoring the associated lighting device (not shown) installed on the intelligent street light 1. For example, the lighting control unit 160 controls and monitors the lighting device's operations such as its lighting level and its switch control. Further, the lighting control unit 160 may communicate with the remote server 200 through the data exchange unit 120 and the data transmission unit 110. For example, the remote server 200 controls the lighting control unit 160 to perform lighting control on the intelligent street light 1, and the lighting control unit 160 monitors a working state of the intelligent street light 1, such that when there is detected abnormality of the intelligent street light 1, abnormality detection information is sent to the remote server 200 to notify the management.

The intelligent street light 1 of the invention may further include a power system (not shown) for supplying electricity to (but not limited to) the street light 1, the external device 300 and the data transmission system 100 for their operation. The data transmission system 100 further includes a power distribution unit 170 (as shown in FIG. 2B) that is electrically connected to the power system. The power distribution unit 170 is used to distribute AC power to various parts that are connected to the power distribution unit 170, such that those parts obtain electricity required for their operation.

Provided that the intelligent street light 1 is usually turned on at night or when the outside becomes dark, that is, the power system of the intelligent street light 1 does not need to continuously supply power, the power distribution unit 170 of the invention is further connected to a UPS unit 171 and a power supply control unit 172. The UPS unit 171 is used to provide (but not limited to) backup power, and the power supply control unit 172 is used to detect a power supply state of the power system. When the power supply control unit 172 detects the power system is in a power on state, it controls the power system to supply electricity to the data transmission system 100 for its operation and to charge the UPS unit 171. When the power supply control unit 172 detects the power system is in a power off state, it controls the UPS unit 171 to output backup power to supply electricity to the data transmission system 100 for its operation.

The data transmission system 100 of the invention may further include a remote monitoring unit 180 for monitoring a power supply state of the power distribution unit 170, a data transmission state of the data transmission unit 110 and an operation state of each of the network devices 130. For example, the remote monitoring unit 180 may monitor three types of states through Web or SNMP: it monitors power supply states of the power distribution unit 170 and the UPS unit 171; it monitors a traffic state to meet SLA (service level agreement) requirements and performs synchronous timing processing on data transmission service (voice, data and video, etc.); and it monitors a device operation state, that is to perform remote control and maintenance on operation of various parts in the data transmission system 100.

Therefore, the intelligent street light of the invention is provided with a data transmission system at the bottom of its lamppost to make the street light not only have a traditional lighting function but also serve as a communication base station for transmitting mobile signals, thereby solving the current problem of having difficulty in finding a place where communication base stations can be built, and improving utilization of public resources of the city. Moreover, as traditional street lights are usually provided with infrastructure including electricity introduction, lightning protection grounding and towers (which have a certain height for wireless signal emission), there is no need to construct such infrastructure when building the communication base stations, thereby desirably reducing construction costs and shortening construction periods thereof. The street lights are also distributed evenly, such that the communication base stations built based on the street lights have advantages of great coverage of communication signals and even distribution, thereby improving the quality of communication.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. An intelligent street light for allowing data transmission between the street light and a remote server, including:
   a lamppost; and
   a built-in data transmission system provided at bottom of the lamppost, the data transmission system including a data transmission unit, a data exchange unit and a plurality of network devices, which are connected to each other,
   wherein, the data transmission unit is for performing data transmission between the data transmission unit and the remote server; and
   the data exchange unit is respectively connected to the data transmission unit and the plurality of network devices so as to provide service of data exchange and transmission between the plurality of network devices and the data transmission unit,
   wherein the data transmission system further includes a fiber distribution unit connected to the data transmission unit;
   wherein the network devices further include a wireless access unit, and the data transmission system further includes an RF over fiber unit for transmitting wireless signals from the wireless access unit to the fiber distribution unit to allow the wireless signals to be transmitted through fiber cables; and
   wherein the data exchange unit is a power over ethernet (PoE) switch unit connected to a terminal, for providing power and data transmission service for the external device.

2. The intelligent street light according to claim 1, wherein the bottom of the lamppost includes a base, and the data transmission system is built in the base, wherein the base includes a receiving space, a discharge space and a liquid guiding structure, wherein the receiving space is located above the discharge space and accommodates the data transmission system, and the liquid guiding structure is disposed inside the lamppost and is for guiding any liquid inside the base away from the receiving space to flow to the discharge space where the liquid is discharged out of the base.

3. The intelligent street light according to claim 1, further including an antenna provided at top of the lamppost, for providing data exchange and transmission service.

4. The intelligent street light according to claim 1, wherein the data transmission unit is a telecom backhaul unit, for performing data transmission between the data transmission system and the remote server by means of various types of xDSL (Digital Subscriber Line), HFC (Hybrid Fiber Coaxial), LTE (Long Term Evolution), Microwave, WiFi and DSRC (Dedicated Short Range Communications).

5. The intelligent street light according to claim 1, wherein the fiber distribution unit is used for performing data transmission between the data transmission system and the remote server by means of PON (Passive Optical Network), CES (Carrier Ethernet Switch), PTN (Public Transport Network) and SDN (Software Defined Network) Switch.

6. The intelligent street light according to claim 1, further including a lamp formed on and extended from the lamppost, and at least one external device provided on the lamp.

7. The intelligent street light according to claim 6, wherein the external device is one of an IP device and a sensor.

8. The intelligent street light according to claim 7, wherein the external device is selectively connected to the data exchange unit, for allowing the data exchange unit to provide data exchange and transmission service for the external device.

9. The intelligent street light according to claim 7, wherein the data exchange unit is connected to an RJ45 terminal.

10. The intelligent street light according to claim 6, wherein the network devices further include a gateway unit selectively connected to the external device, for managing the external device, setting configuration parameters of the external device and providing data transmission service for the external device.

11. The intelligent street light according to claim 10, wherein the gateway unit is an IoT gateway unit, which includes a southbound interface for being connected to the external device, and a northbound interface for being connected to the data exchange unit or for direct LTE backhaul.

12. The intelligent street light according to claim 10, wherein the intelligent street light is for allowing data transmission between the street light and a near end device, and the gateway unit is selectively connected to the near end device, for managing the near end device, setting configuration parameters of the near end device and providing data transmission service for the near end device.

13. The intelligent street light according to claim 12, wherein the near end device is one of a gateway unit provided close to a body of the intelligent street light, an IP device and a sensor.

14. The intelligent street light according to claim 1, wherein the network devices further include a wireless access unit for allowing at least one mobile client to perform wireless accessing so as to provide data exchange and transmission service for the mobile client.

15. The intelligent street light according to claim 1, wherein the network devices further include a lighting control unit for controlling and monitoring a lighting device mounted on the intelligent street light.

16. The intelligent street light according to claim 1, further including a power system for providing power required for operation of the intelligent street light.

17. The intelligent street light according to claim 16, wherein the data transmission system further includes a power distribution unit electrically connected to the power system and connected to an uninterruptible power system (UPS) unit and a power supply control unit, wherein:

the UPS unit is for providing backup power;

the power supply control unit is for detecting a power supply state of the power system, wherein if the power system is detected being in a power on state, the power supply control unit controls the power system to supply electricity to the data transmission system and to charge the UPS unit, and if the power system is detected being in a power off state, the power supply control unit controls the UPS unit to output the backup power to supply electricity to the data transmission system.

18. The intelligent street light according to claim 17, wherein the data transmission system further includes a remote monitoring unit for monitoring a power supply state of the power distribution unit, a data transmission state of the data transmission unit, an operation state of the network devices and a synchronous timing state of the network devices.

* * * * *